United States Patent [19]
Yamashita et al.

[11] 3,856,383
[45] Dec. 24, 1974

[54] REAR VISION MIRROR APPARATUS FOR AUTOMOBILE

[75] Inventors: Makoto Yamashita, Sagamihara; Kenkichi Ikura, Yokohama; Masagoro Kushida, Isehara, all of Japan

[73] Assignee: Ichika Industries Limited, Tokyo, Japan

[22] Filed: Sept. 25, 1972

[21] Appl. No.: 291,624

[30] Foreign Application Priority Data
Oct. 1, 1971 Japan.............................46-90036

[52] U.S. Cl.................. 350/302, 350/301, 350/299, 350/288
[51] Int. Cl.............................................. G02b 5/08
[58] Field of Search........... 350/302, 276, 311, 301, 350/299, 288, 283; 351/57; 52/171; 98/93, 90, 91, 92

[56] References Cited
UNITED STATES PATENTS

| | | | |
|---|---|---|---|
| 1,986,405 | 1/1935 | Mears | 52/171 |
| 2,525,012 | 10/1950 | Armstrong | 350/283 |
| 2,737,847 | 3/1956 | Tesauro | 351/57 |
| 2,855,242 | 10/1958 | Holmes | 350/311 |
| 3,043,195 | 7/1962 | Moultrie | 350/302 |
| 3,498,697 | 3/1970 | Matteo | 350/302 |
| 3,645,607 | 2/1972 | Whitney | 350/301 |
| 3,773,406 | 11/1973 | Baumgardner | 350/299 |

*Primary Examiner*—Ronald L. Wibert
*Assistant Examiner*—Michael J. Tokar
*Attorney, Agent, or Firm*—Wenderoth, Lind & Ponack

[57] ABSTRACT

A rear vision mirror apparatus of periscope type to provide a rear field of vision via the roof top of an automobile, comprising; a cylindrical housing fixed to the roof top and having an open rear end sealed tightly by a transparent cover and also having a front lower portion opening into the driver's chamber at a position close to the front window pane of the automobile; an objective mirror and a reflecting mirror arranged in said housing; and an eye-piece mirror povitably secured below said open front lower portion, that lowermost end part of the housing located in the immediate foreground of said transparent cover being provided with a rearward open portion communicating with the driver's chamber. By actuating the defroster provided on the automobile, the heated air ascending along with the front window pane enters into the housing through the open front lower portion and contacts the inner face of the transparent cover and exits into the driver's chamber through said rearward open portion of the housing, thus preventing frost from developing on the inner surface of the transparent cover.

4 Claims, 5 Drawing Figures

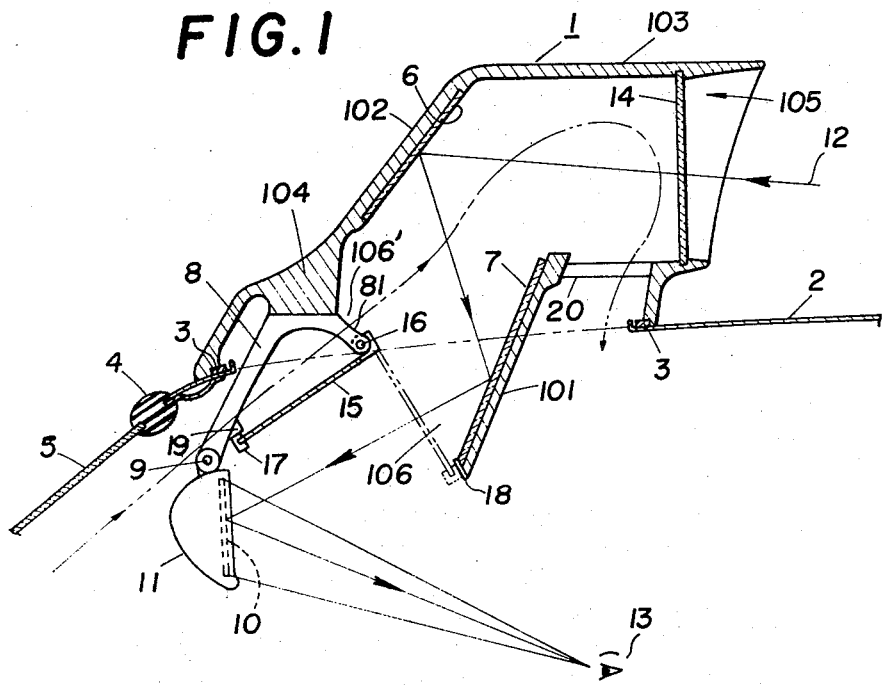
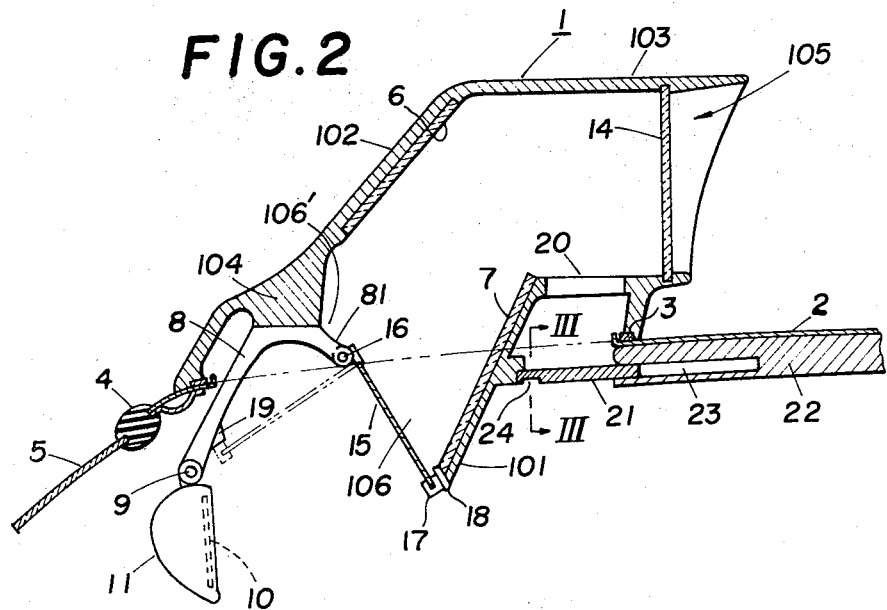

REAR VISION MIRROR APPARATUS FOR AUTOMOBILE

BACKGROUND OF THE INVENTION

1. Field of the invention

The present invention pertains to a rear vision mirror apparatus for automobile, and more particularly, it relates to a rear vision mirror apparatus of the periscope type having a rear view window provided on the roof top of an automobile and having an optical system contained therein to enable the driver of the automobile to have a clear view to the rear thereof through this window.

2. Description of the prior art

In an automobile, an arrangement is typically provided so that the driver is provided with a view to the rear of the automobile by means of a room mirror positioned at the forward central portion of the driver's chamber and also by means of outside mirrors secured externally on both sides of the body of the automobile. However, this room mirror is arranged so that the driver can have a view to the rear of the automobile through the rear window of the automobile. Accordingly, the field of vision is limited depending on the dimension of the rear window. Especially, in case safety head rests are provided on the rear seat and/or when there are passengers seated in the passengers' chamber and/or in case there are some articles on the rack behind the passengers' seat adjacent to the rear window, the rear field of vision is obstructed markedly. On the other hand, the outside mirrors offer a compensatory effect of the room mirror and each of them gives a rear view on either side of the vehicle. However, because these outside mirrors are positioned substantially remote from the position of the room mirror, there is the inconvenience that, if it is intended to observe the entire condition of the traffic, the driver has to look in two different directions, left and right, alternatively.

In order to eliminate the foregoing defects and disadvantages of the rear viewing devices of the prior art comprising a room mirror and two outside mirrors, there has been proposed a rear viewing apparatus of the so-called periscope type comprising a rear view opening portion provided on the roof top of an automobile and a plurality of optical systems arranged so that the driver at his driving position is able to view to the rear of the automobile through said opening.

In the aforesaid conventional rear viewing apparatus of the periscope type, wind and rain intrude into the chamber of the automobile through its rear opening intended to have a rear field of vision. Therefore, it has been the general practice to seal this opening by a transparent cover made of either glass or a transparent synthetic resin. Accordingly, in case the external temperature is lower than that inside the chamber as in winter time, the moisture present in the chamber of the automobile may condense to produce frost on the inner surface of the transparent cover due to the difference in temperature between the inside and the outside of the housing and as a result, the rear field of vision will be obstructed. Especially in a rear viewing apparatus arranged so that an objective mirror and a reflecting mirror are attached inside the housing and a transparent cover is provided at the extreme rear end of the housing, it is quite difficult for the fingers of a person to reach that rear end to wipe the frost away. For the foregoing reasons, it is very important to arrange the rear viewing device of this type to keep the transparent cover from producing frost on its surface.

SUMMARY OF THE INVENTION

It is, therefore, a primary object of the present invention to provide a rear vision mirror apparatus of periscope type for use in automobiles which is arranged so that an objective mirror and a reflecting mirror are incorporated in a cylindrical housing whose extreme rear end opening is sealed by a transparent cover and which is free from developing frost on its inner surface even when there is a difference in temperature between the inside and the outside of the housing.

Another object of the present invention is to provide a rear vision mirror apparatus of the type described, which utilizes a defroster of the type provided in general in automobiles for the prevention of frost formation on the front window pane and which, when this defroster is actuated for the prevention of frost formation on the front window pane, will prevent the development of frost on the inner surface of the transparent cover.

These as well as other objects and attendant advantages of the present invention will become apparent from the following detailed statement with respect to the preferred embodiments of the invention when taken in conjunction with the accompanying drawings.

BRIEF DESCRIPTION OF THE DRAWINGS

FIG. 1 is a vertical sectional view of the rear vision mirror apparatus for automobile, showing an embodiment of the present invention.

FIG. 2 is a view similar to that of FIG. 1, but shows another embodiment of the invention.

DETAILED DESCRIPTION OF THE PREFERRED EMBODIMENTS

Figure 3:
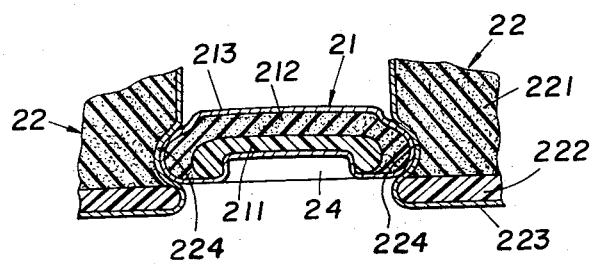
FIG. 3 is a sectional view, on an enlarged scale, taken along the line III—III in FIG. 2.

In FIG. 1, 1 represents a housing made with a synthetic resin molded into an integral structure. This housing 1 is composed of a lower rear wall 101 slanting obliquely forwardly, an upper front wall 102 slanting in the same fashion, an upper wall extending rearwardly from the upper end of said upper front wall 102, and a supporting seat member 104. This housing has an opening 105 formed at the upper rear end thereof and another opening 106 formed in the foreground of said lower rear wall 101, respectively. This housing 1 is liquid-tightly secured via seal packings to the roof top 2 of an automobile at a position close to the front window pane 5. The forward portion of this roof 2 is connected to the front window pane 5 via a seal rubber member 4 in a manner as is well known.

On the inner surface of the upper front wall 102 of the housing 1 is fixed a planar objective mirror 6. Also, on the inner surface of the lower rear wall 101 is fixed a similar planar reflecting mirror 7. A stay 8 is secured to the lower face of the supporting seat member 104. A mirror holder 11 which supports an eye-piece mirror 10 is pivotably secured via a pin 9 to the lowermost end of this stay 8.

Said eye-piece mirror 10 is positioned at an upper portion in the foreground of the driver's seat. Also, the objective mirror 6 and the reflecting mirror 7 are arranged such that the incident light beams 12 coming from the rearward field of vision of the automobile impinge onto the eye-piece mirror 10 after being reflected by the objective mirror 6 and the reflecting mirror 7. Accordingly, the image of the rearward field of vision relative to the automobile is projected onto the eye-piece mirror 10 by the combination of the objective mirror 6 and reflecting mirror 7. This projected image can be viewed by the eyes 13 of the driver. In addition, either upwardly or downwardly by pivoting the mirror holder 11 of the eye-piece mirror 10 about the pin 9, it is possible to correct the rearward field of vision.

A transparent cover 14 made of either a synthetic resin or glass is mounted onto the open portion 105 of the upper rear end of the housing 1. This transparent cover 14 serves to shutter the inside of the housing from the outside thereof.

15 represents a light-attrition filter. This filter 15 is hinged by a pin 16 to an arm 81 which branches from the stay 8 of the eye-piece mirror 10. Either a permanent magnet or a steel or iron piece 17 is attached to the free end of said filter 15. At the lowermost end of the lower rear wall 101 and also at such an intermediate site of the stay 8 as will correspond to the extreme end position of swing of the permanent magnet or the steel or iron piece provided at the free end of said filter 15, there are fixed steel or iron pieces or permanent magnets 18 and 19. Accordingly, at the position shown by a solid line at which the filter 15 is attracted to and held by the steel or iron piece or the permanent magnet 18, the incident light rays 12 coming from the rearward field of vision are passed through the transparent cover 14, and via the objective mirror 6 and the reflecting mirror 7, are projected onto the eye-piece mirror 10 after the intensity thereof is decreased to an appropriate degree by said light-attrition filter 15. Thus, the image of the light rays can be viewed clearly by the eyes 13 of the driver. This light attrition filter 15 is used to protect the driver's vision from being impaired which may be caused by, for example, the glaring headlights of the cars running behind the driver's automobile during the night time. On the other hand, during the daytime when the image will not dazzle the driver, the light-attrition filter 15 is manipulated so that it is attracted to the steel or iron piece or the permanent magnet 19 side which is provided on the stay 8, and is held at the position out of the path of light, namely, at the position indicated by the solid line as shown.

20 represents a rearward open portion formed in the bottom of the housing at a position in the immediate foreground of the transparent cover 14. The inside of the housing communicates with the chamber of the automobile via said rearward open portion and the aforesaid front lower open portion 106.

The stay 8 of the eye-piece mirror and a branched arm 81 of the housing for supporting the light-attrition filter both protrude onto the front window pane side located in the foreground of the front lower open portion 106 of the housing. It should be understood, however, that this protruding branched arm 81 is provided only at the sides of the housing so that said front lower open portion 106 is open substantially toward the front window pane.

Also, the branched arm 81 which supports the light-attrition filter 15 protrudes transversely of the front lower open portion 106, and the light-attrition filter 15 is hinged at its foremost end by a pin. Therefore, even when this filter is used, a space 106' remains as shown which is defined by the level of the branched arm 81.

The rear vision mirror apparatus having the foregoing arrangement is operative so that, by actuating a defroster, not shown, of the type employed in automobiles in general, the heated air from the defroster ascends along the front window pane 5 and enters into the housing through the front lower open portion 106 and then exits into the chamber of the automobile through the rearward open portion 20 after turning downwardly along the transparent cover 14, as indicated by the two-dot chain line.

As such, even when the temperature outside the chamber of the automobile is lower than that inside the chamber as in the winter time, the inconvenience that the transparent cover will not become frosted and the rear field of vision will thus not be obstructed. If the inner surface of the transparent cover becomes frosted, this frost can be quickly removed by merely actuating the defroster.

The aforesaid function of preventing the formation of frost on the inner surface of the transparent cover is accomplished not only when the light-attrition filter is not in use, but also when this filter is in use. This is because of the fact that the supporting portion of the filter protrudes in the transverse direction relative to the front lower open portion 106 and since the light-attrition filter is attached at the foremost end of this protrusion, even during the use of this filter, there is a space 106' through which the heated air from the defroster flows into the housing.

FIG. 2 is an arrangement of the apparatus which is of a structure substantially similar to that of FIG. 1 but the difference lies in the additional arrangement that, when the rearward open portion 20 is not needed, this open portion can be shielded. More specifically, in the inner part 22 which is applied to the inner surface of the roof 2 a space 23 is provided for the accommodation of a cover member 21. The cover member 21 is slidably inserted in this space 23. By pushing this cover member 21 into the space 23, the rearward open portion 20 is exposed. On the other hand, when this rearward open portion 20 is not in use, the cover member 21 is pulled out from the space 23 in the manner as indicated by the solid lines shown in FIG. 2 so that the rearward open portion 20 is shielded by this cover member 21. This cover member 21 is preferably made with a core member which is a molded hard plastic material 211 lined with an elastic material 212 such as a foamed urethane and the resulting lined member is completely covered with a leather sheet 213. The inner pat 22 shown in FIG. 3 is lined with a foamed urethane 221 and a plastic material 222 and enclosed with a leather sheet 223, and grooves 224 are formed on the bilateral inner surfaces whereby the cover member 21 is allowed to slide in said grooves for opening and closing aperture 20. In FIG. 2, an arrangement is shown wherein the cover member 21 is allowed to slide back and forth. It should be understood, however, that this arrangement may be modified so that the cover member 21 is allowed to slide sideways.

Figure 4A:
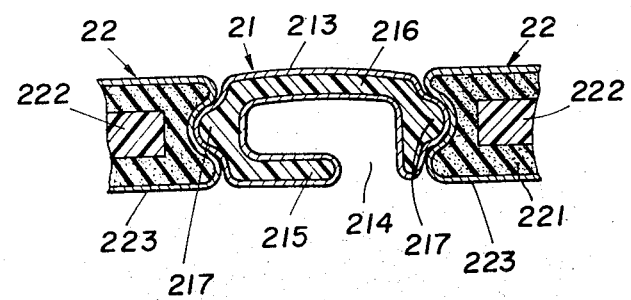
FIG. 4 is an illustration showing a modification of the openable cover member of the rearward opening, in which (A) is a sectional view showing the state in which this cover member is closed, and (B) is a sectional view showing the state in which the cover member is being removed.
Figure 4B:
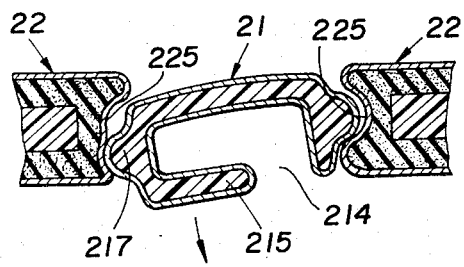

Furthermore, as shown in FIG. 4, an arrangement may be provided so that the cover member 21 is detachably fitted into the inner part 22. More specifically, a cover member 216 is prepared with a hard plastic material in such a manner that it has an opening 214 for the insertion of a finger tip of a person and a hook 215 for the application of the finger tip thereto, and also that it has bulging portions 217 formed at both sides thereof. This item is covered with a leather sheet 213 to form a complete cover member 21. On the other hand, a portion of the inner part 22 corresponding in position to the rearward open portion 20 of the housing is cut out to provide an opening, and those portions of the inner part which are thus cut open are enclosed with a foamed urethane 221 and lined and covered with a leather sheet 223. The inner surfaces on both sides of this opening are provided with grooves 225 and 225 having a size sufficient for the bulging portions 217 and 217 to be fitted therein.

With this arrangement, it is possible to insert a finger tip through the opening 214 and to apply this finger tip to said hook 215 and to pull this hook downwardly. The foamed urethane sheet 221 will consequently deform in such a way as shown by (B) of FIG. 4 so that the cover member 21 can be removed from the grooves 225. Conversely, by pushing the cover member 21 inwardly by the hook, it can be fitted in the grooves as shown in FIG. 4(A).

We claim:

1. A rear vision mirror apparatus of the periscope type to provide a rear field of vision via the roof top of an automobile, comprising: a cylindrical housing fixed to the roof top and having an open rear end sealed tightly by a transparent cover and also having a front lower portion opening into the driver's chamber at a position close to the front window pane of the automobile; an objective mirror and a reflecting mirror operatively arranged in said housing; and an eye-piece mirror pivotably secured below said open front lower portion, the lowermost end part of the housing located in the immediate foreground of said transparent cover being provided with a rearward open portion communicating with the driver's chamber, and of sufficient size for a person to manually clean said transparent cover, said open front lower portion and said rearward open portion cooperatively forming a passageway for heated air from a defroster, the heated air passing into the housing through said lower front portion thereby preventing frost from forming on said transparent cover, and returning to the interior of said automobile through said rearward open portion; a movable cover member mounted within said rearward open portion and adapted for blocking said passageway and terminating the flow of heated air when the rear field of vision may be clearly viewed through said transparent cover, the portion of the device applied to the inner surface of the roof of the automobile forming a space for the accommodation of said cover member, said cover member being slidably insertable within said space so that, by sliding this cover member, the rearward open portion may be blocked and unblocked; a light attrition filter and a stay for pivotally securing said eyepiece mirror to the housing, said stay having a branched arm to provide a support for the light-attrition filter, one end of said filter being pin-hinged to said support, whereby said filter may assume a selected position between a position transverse to the optical path leading from the reflecting mirror to the eye-piece mirror and a position out of line of said optical path.

2. A rear vision mirror apparatus according to claim 1, in which said light-attrition filter has a steel or iron piece at its free end and permanent magnets are provided on the housing at such positions corresponding to the swing of said piece, whereby by having this steel or iron piece of the light-attrition filter attracted to either one of the magnets, the filter can be held in a selected position.

3. A rear vision mirror apparatus according to claim 1, in which the light-attrition filter has a permanent magnet at its free end, and steel or iron pieces are provided on the housing at such positions corresponding to the swing of said piece, whereby by having this permanent magnet of the filter attracted to either one of the steel or iron pieces, the filter can be held in its selected position.

4. A rear vision mirror apparatus according to claim 1, in which said support of the light-attrition filter protrudes in a direction transversing the open front lower portion of the housing and in which said filter is pin-hinged to the foremost end of said support, whereby even when the light-attrition filter is set at a position transversing the optical path leading from the reflecting mirror to the eye-piece mirror, there is still left by virtue of said support a space through which the heated air from a defroster is passed therethrough.

* * * * *